United States Patent
Murakami et al.

(10) Patent No.: US 6,570,707 B1
(45) Date of Patent: May 27, 2003

(54) TOUCH PANEL WITH HIGH OPERABILITY IN LOW TEMPERATURE ENVIRONMENTS

(75) Inventors: Yukio Murakami, Kameoka (JP); Shunsuke Hirano, Kameoka (JP)

(73) Assignee: Gunze Limited, Koyoto (JP)

(*) Notice: Subject to any disclaimer, the term of this patent is extended or adjusted under 35 U.S.C. 154(b) by 29 days.

(21) Appl. No.: 09/708,879

(22) Filed: Nov. 8, 2000

(30) Foreign Application Priority Data

Nov. 10, 1999 (JP) .......................................... 11-320255

(51) Int. Cl.$^7$ ................................................ G02B 5/30
(52) U.S. Cl. ..................... 359/497; 250/225; 345/87; 345/156; 345/173; 349/12; 349/23; 349/149; 349/62; 349/96; 349/150; 349/176; 349/199
(58) Field of Search ..................... 359/497; 250/225; 345/87, 156, 173; 349/12, 23, 58, 62, 96, 149, 150, 176, 199, 201

(56) References Cited

FOREIGN PATENT DOCUMENTS

| JP | 624812 | 5/1990 |
| JP | 5127822 | 5/1993 |
| JP | 5-127822 | * 5/1993 |
| JP | 1048625 | 2/1998 |

\* cited by examiner

*Primary Examiner*—Audrey Chang
*Assistant Examiner*—Craig Curtis

(57) ABSTRACT

A touch panel is constructed of a top sheet member having a resistive membrane on its inner surface and a base sheet member having a resistive membrane on its inner surface, the top and base sheet members facing each other with dot spacers being located in between. The top sheet member is formed by laminating a bulge-resistant film, a polarizing plate, a quarter wavelength plate, and a light isotropic film in this order from above. The base sheet member is constructed of a glass sheet and a reinforcement film whose thermal linear expansion coefficient is almost the same as the thermal linear expansion coefficient of the polarizing plate or the quarter wavelength plate included in the top sheet member, the reinforcement film being adhered to the lower surface of the glass sheet.

14 Claims, 7 Drawing Sheets

(TABLE 1)

| LAMINATED MATERIAL | THICKNESS μm | THERMAL LINEAR EXPANSION COEFFICIENT $10^{-5}$ cm/cm/°C |
|---|---|---|
| PET FILM | 188 | 1.5 |
| POLARIZING PLATE (TAC/PVA/TAC) | 130 | 5.4 |
| QUARTER WAVELENGTH PLATE(PC) | 80 | 6.2 |
| LIGHT ISOTROPIC FILM (POLYOLEFIN RESIN) | 188 | 6.2 |
| GLASS | 700 | 0.7 |
| REINFORCEMENT FILM | t | |

FIG.4

(TABLE 1)

| LAMINATED MATERIAL | THICKNESS µm | THERMAL LINEAR EXPANSION COEFFICIENT $10^{-5}$cm/cm/°C |
|---|---|---|
| PET FILM | 188 | 1.5 |
| POLARIZING PLATE (TAC/PVA/TAC) | 130 | 5.4 |
| QUARTER WAVELENGTH PLATE (PC) | 80 | 6.2 |
| LIGHT ISOTROPIC FILM (POLYOLEFIN RESIN) | 188 | 6.2 |
| GLASS | 700 | 0.7 |
| REINFORCEMENT FILM | t | |

FIG.6

(TABLE 2)

| REINFORCEMENT FILM | | ATMOSPHERIC CONDITION | | | |
|---|---|---|---|---|---|
| MATERIAL | t μm | −20°C | 0°C | 20°C | 40°C |
| TAC | 80 | △ | ○ | ○ | ○ |
| TAC | 160 | ○ | ○ | ○ | ○ |
| PC | 80 | △ | ○ | ○ | ○ |
| PC | 160 | ○ | ○ | ○ | ○ |
| WITHOUT REINFORCEMENT FILM | | × | △ | ○ | ○ |

TOUCH PANEL WITH HIGH OPERABILITY IN LOW TEMPERATURE ENVIRONMENTS

BACKGROUND OF THE INVENTION

1. Field of the Invention

The present invention relates to a touch panel, and more particularly relates to a technique for improving the operability of a touch panel in environments that involve relatively low temperatures.

2. Description of the Related Art

A typical touch panel is constructed of an ultrathin glass plate (base sheet member) and a flexible transparent resin film (top sheet member) that are set facing each other and have resistive membranes on their opposed surfaces, with spacers being placed between the two sheet members in order to provide a certain spacing. When a user presses the surface of the transparent resin film using a stylus or the like, the two resistive membranes face each other at a certain distance come into contact at the pressed position. This changes the resistance between electrodes connected to each resistive membrane. Therefore, by detecting the resistance, information for the position pressed by the user can be obtained.

Touch panels are being used in an ever-widening range of applications as input terminals. As a result, additional features are also desired for the touch panels. As an example, when a touch panel is provided over a liquid crystal display (LCD) panel of a device that is used outdoors, such as a car navigation system or a portable computer, a touch panel may be glare-resistant by covering the panel with a polarizing plate. This stops the visibility of the display of the LCD panel from decreasing due to the reflection of incident light.

The polarizing plate used here is usually made by processing a resin film. Such a polarizing resin film has a thermal linear expansion coefficient eight to nine times that of the glass which forms the base sheet member.

A large difference between the thermal linear expansion coefficients of the top and base sheet members causes the following problems. As the temperature rises, the whole top sheet member including the polarizing plate bulges outward, ruining the appearance of the touch panel. The operability of the touch panel also decreases, as the space between the top and base sheet members widens and forces the user to apply a greater pressure to operate the touch panel. Due to the recent increases in the size of LCDs, the size of touch panels is also on the increase, so that outward bulge of the top sheet member is likely to increase, making touch panels even more difficult to operate.

In view of the above problems, the applicant of the present invention has devised a touch panel where the upper surface of the polarizing plate is covered with a resin film having a lower thermal linear expansion coefficient than the polarizing plate to keep the polarizing plate from bulging outward. An experiment was conducted on the operability of the touch panel in which a PET (polyethylene terephthalate) film is used as the bulge-resistant film. The bulge-resistant film was found to effectively prevent the polarizing plate from bulging outward with a rise in ambient temperature, and the touch panel demonstrated high operability.

On the contrary, even with the structure described above, the operability of the touch panel deteriorated when the ambient temperature fell below 0° C. With the current demand for lighter portable devices, such as a portable computer, equipped with a touch panel, a thinner glass should be used as the base sheet of the touch panel. The use of a thinner glass would however further impair the operability of the touch panel at a low ambient temperature.

Portable devices equipped with a touch panel can easily be carried anywhere, and so may be used in a great variety of conditions. If taken outdoors in cold districts, devices equipped with a touch panel may end up being operated at an ambient temperature below 0° C. Therefore, it is desirable to ensure high operability of the touch panel even in low temperature environments.

These problems that occur at low temperatures when the base sheet member is made thinner also occur when the top sheet member, and not just a polarizing plate, is made of a resin film with a high thermal linear expansion coefficient.

SUMMARY OF THE INVENTION

In view of the above problems, the present invention aims to provide a touch panel that does not suffer from poor operability at low temperatures, even if the base sheet member is made thinner.

The above object can be achieved by a resistive-membrane touch panel comprising: a first sheet member having a first resistive membrane on a main surface thereof; a second sheet member that is flexible and has a second resistive membrane on a main surface thereof, the second sheet member being opposed to the first sheet member with a spacer in between so that the second resistive membrane and the first resistive membrane face each other with a certain spacing therebetween; and a third sheet member that is provided on at least a part of another main surface of the first sheet member that does not face the second sheet member, wherein the third sheet member has a higher thermal linear expansion coefficient than the first sheet member.

With this construction, even when the second sheet member contracts by a greater amount than the first sheet member due to a low ambient temperature, causing the first sheet member to bend outward, the third sheet member with a higher thermal linear expansion coefficient that is at least partly laminated on the outer main surface of the first sheet member acts to suppress the outward bend of the first sheet member from outside. This prevents the distance between the two resistive membranes formed on the opposed surfaces of the first sheet member and the second sheet member from widening, thereby maintaining high operability of the touch panel.

Here, the second sheet member of the resistive-membrane touch panel may include a polarizing plate whose thermal linear expansion coefficient is higher than a thermal linear expansion coefficient of the first sheet member, and the thermal linear expansion coefficient of the third sheet member may be almost the same as the thermal linear expansion coefficient of the polarizing plate.

With this construction, the third sheet member contracts by almost the same amount as the second sheet member at low temperatures. As the above two sheet members contract in the same degree, the forces acted upon both sides of the first sheet member are well balanced, thereby the outward bend of the first sheet member can be suppressed by the proper pressure from the third sheet member.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 is a table showing thicknesses and thermal linear expansion coefficients of structural members laminated in the touch panel;

FIG. 6 is a table showing the results of comparative experiments on the operability of the touch panel with or without a reinforcement film, in low temperature environments;

DESCRIPTION OF THE PREFERRED EMBODIMENT

The following is a description on a touch panel according to an embodiment of the present invention, with reference to the figures.

(Overall Construction of a Touch Panel 100)

Figure 1:
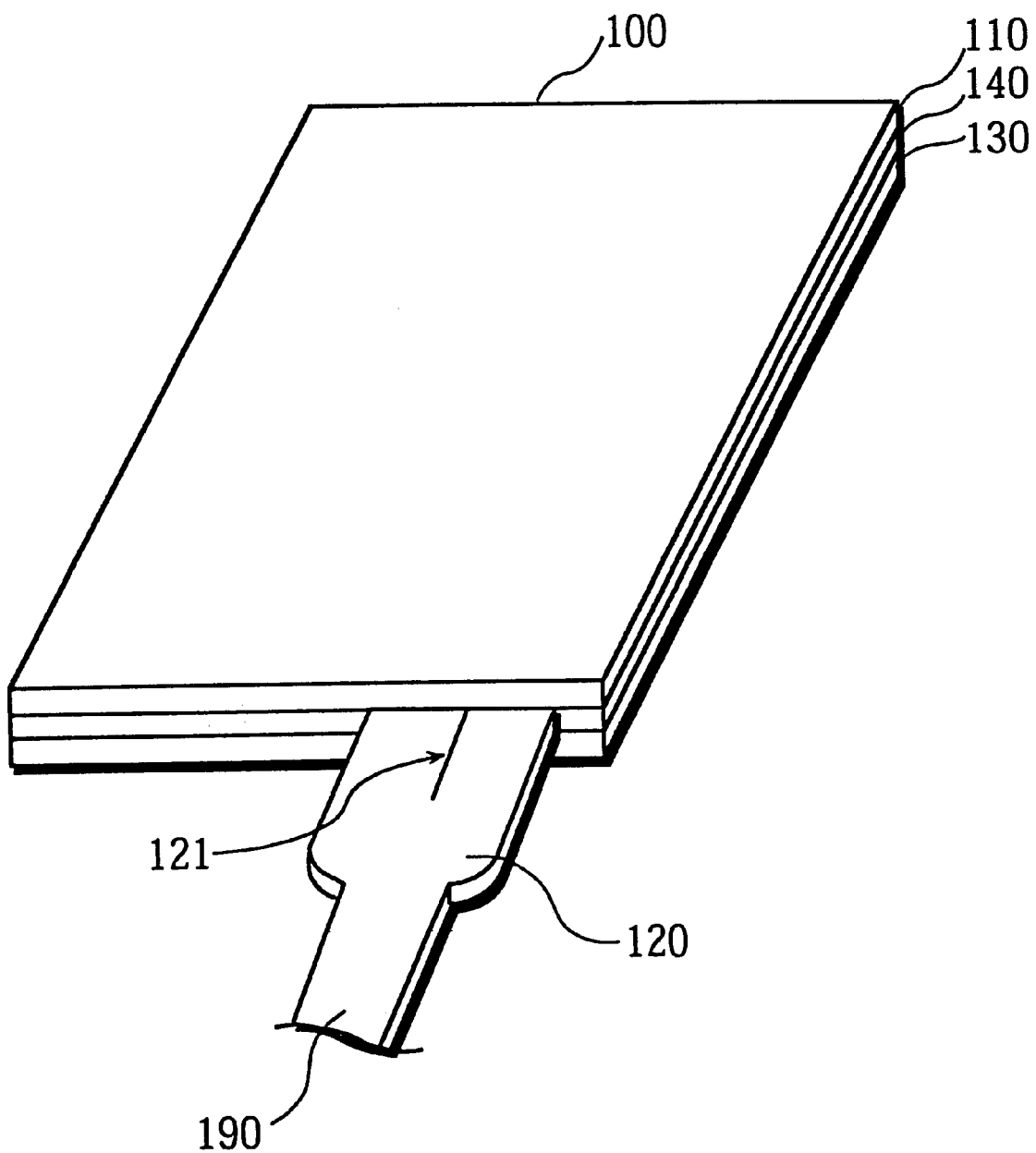
FIG. 1 is a perspective view of a touch panel according to an embodiment of the present invention.

FIG. 1 is a perspective view of a touch panel 100 according to the embodiment of the invention.

As illustrated, the touch panel 100 is formed by providing a top sheet member 110 over a base sheet member 130 with a spacer 140 being placed therebetween.

The top sheet member 110 is a flexible, transparent sheet member that the user touches with a finger or a stylus, and is made by laminating a plurality of resin films (described later). Reference numeral 120 is a connector that is connected to electrodes inside the touch panel 100.

Figure 2:
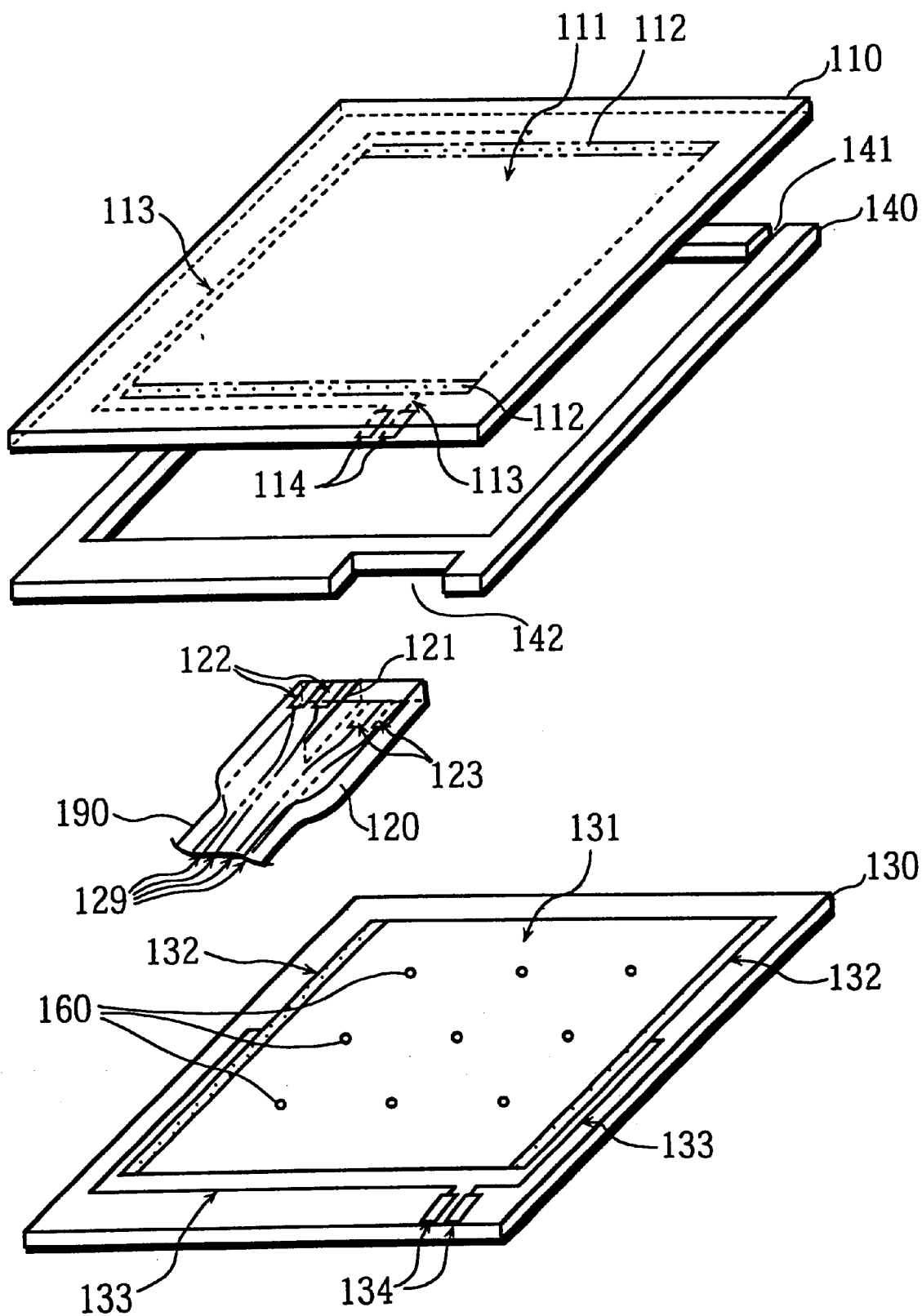
FIG. 2 is an exploded view showing the construction of the touch panel.

FIG. 2 is an exploded view of the touch panel 100 shown in FIG. 1.

In the figure, the spacer 140 has a shape of a picture frame except for a gap 141. The spacer 140 is made of a PET film or the like. Adhesive is applied to both upper and lower sides of the spacer 140, and the top sheet member 110 and the base sheet member 130 are bonded with the spacer 140 along their edges. The gap 141 is provided in the spacer 140 so that at one position there is no spacer material between the top sheet member 110 and the base sheet member 130. This gap 141 releases air from inside the touch panel 100. As the ambient temperature changes, air trapped between the top sheet member 110 and the base sheet member 130 expands or contracts. However, since the gap 141 allows air in and out, the internal pressure is kept equal to the external pressure. Accordingly, there will be no degradation in operability caused by the internal pressure increasing relative to the external pressure due to the thermal expansion of the air inside the touch panel. The larger the size of the touch panel 100, the larger the volume of the space between the top sheet member 110 and the base sheet member 130, which means a greater amount of air flows through the gap 141 as the temperature changes. In such a case, it may be necessary to provide more gaps like the gap 141 in the touch panel 100.

In FIG. 2, in addition to the gap 141, another gap is provided at the rearmost corner of the spacer 140 (not shown), that is, two gaps are provided in total.

Also, the spacer 140 has a recessed part 142 into which the connector 120 is to be inserted.

Dot spacers 160 are provided at a certain interval between the base sheet member 130 and the top sheet member 110 inside the inner edges of the spacer 140. Together with the spacer 140, the dot spacers 160 serve to keep the distance between the opposed surfaces of the top sheet member 110 and base sheet member 130 uniformly at around 100 $\mu$m.

A resistive membrane 111 made of ITO (indium tin oxide) is formed across almost all of a main surface of the top sheet member 110 opposed to the base sheet member 130 by sputtering. A pair of electrodes 112 are disposed on two opposite sides of the resistive membrane 111. Also, a pair of electrode terminals 114 to be coupled to a pair of connector electrodes 122 formed on the connector 120 are located on a part of the lower surface of the top sheet member 110 that is not covered with the resistive membrane 111 and comes into contact with the connector 120. The pair of electrode terminals 114 and the pair of electrodes 112 are connected via a pair of wiring patterns 113.

The base sheet member 130 is made of an ultrathin glass. Like the top sheet member 110, a resistive membrane 131 made of ITO is formed across almost all of a main surface of the base sheet member 130 opposed to the top sheet member 110 by sputtering. A pair of electrodes 132 are disposed on two opposite sides, that are perpendicular to the two sides of the resistive membrane 111 on which the pair of electrodes 112 are disposed, of the resistive membrane 131. Also, a pair of electrode terminals 134 to be coupled to a pair of connector electrodes 123 formed on the connector 120 are located on a part of the upper surface of the base sheet member 130 that is not covered with the resistive membrane 131 and comes into contact with the connector 120. The pair of electrode terminals 134 and the pair of electrodes 132 are connected via a pair of wiring patterns 133.

The connector 120 is one end of a connecting cable 190 which is made by forming four wiring patterns 129 on a resin film of PET or polyimide with a paste made of silver or the like and covering them with another resin film of the same material. The ends of the four wiring patterns 129 are exposed on the upper and lower surfaces of this connector 120 in pairs with carbon printing being applied to the exposed ends to form the pair of connector electrodes 122 and the pair of connector electrodes 123.

The four wiring patterns and the four connector electrodes are not separated but combined in a single connector to reduce the cost of materials and the steps needed for manufacturing.

In the completed touch panel 100, the pair of connector electrodes 122 and the pair of connector electrodes 123 are respectively bonded to the pair of electrode terminals 114 of the top sheet member 110 and the pair of electrode terminals 134 of the base sheet member 130. This bonding of a connector electrode and an electrode terminal is done by first coating the bonding area with a mixed silver-carbon conductive paste which is the common material of the wiring patterns, and then applying thermocompression bonding from both sides.

Also, an incision 121 is provided between the pair of connector electrodes 122 and the pair of connector electrodes 123 in the connector 120, in order to relieve stress caused by the difference in thermal linear expansion coefficient between when the top sheet member 110 and the base sheet member 130. Even when the top sheet member 110 and the base sheet member 130 expand by differing degrees as the temperature rises, stress that would act on the connector 120 due to the difference in expansion can be absorbed by the incision 121. Hence poor contact and disconnections hardly occur in.this part over a wide range of temperatures.

(Laminated Structure of the Touch Panel 100)

Figure 3:
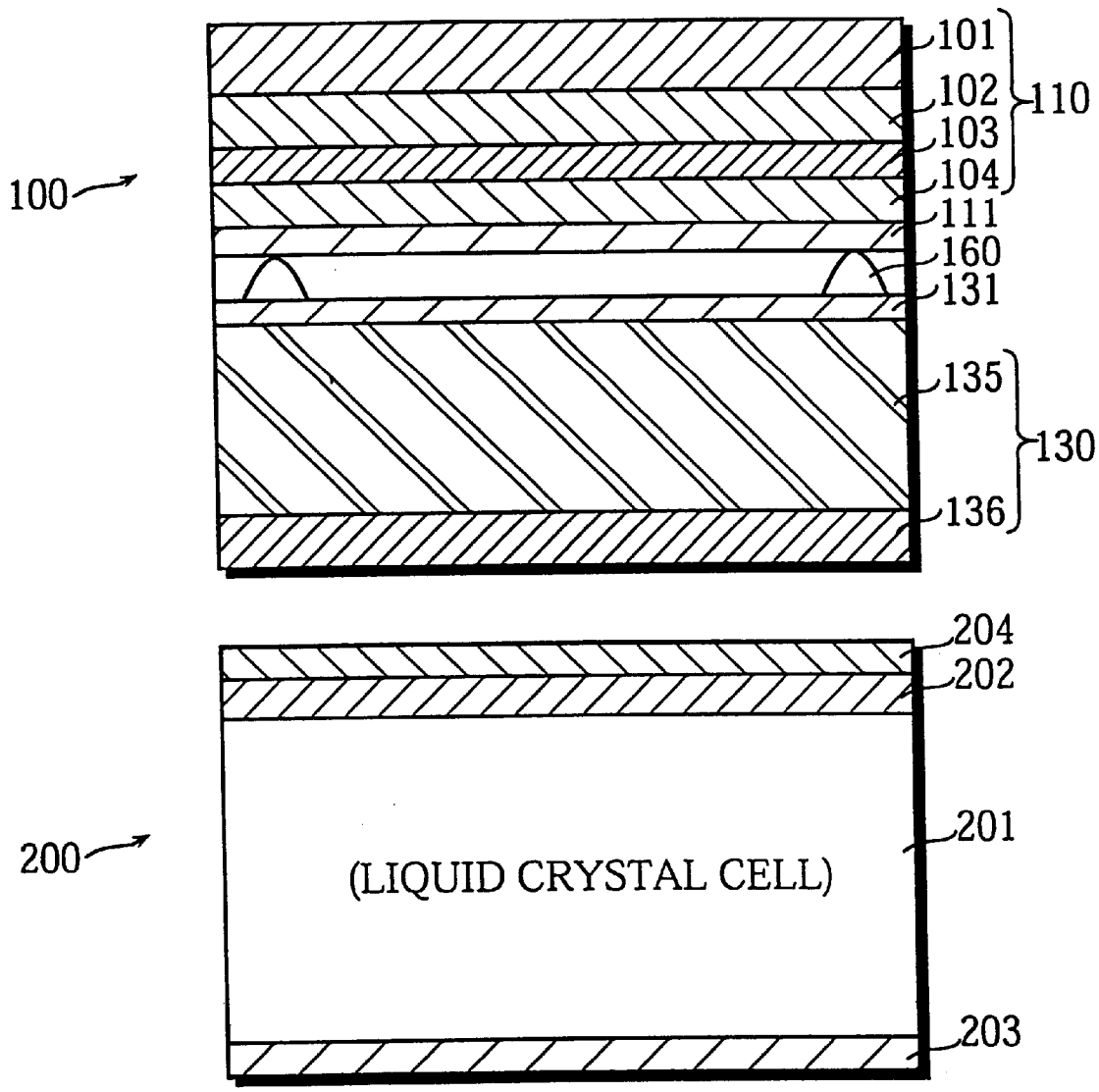
FIG. 3 is a partly enlarged sectional view showing the laminated structure of the touch panel.

FIG. 3 is a partly enlarged sectional view showing the laminated structure of the touch panel 100. For ease of explanation, the laminated structure of an LCD panel 200 on which the touch panel 100 is mounted is also shown.

In the figure, the top sheet member 110 is made by laminating a bulge-resistant film 101, a polarizing plate 102, a quarter wavelength plate 103, and a light isotropic film 104 in this order from above, through the use of adhesive (not shown). The resistive membrane 111 is formed below the lowest light isotropic film 104.

In this embodiment, a PET film is used as the bulge-resistant film 101.

The base sheet member 130 is constructed of a glass sheet 135 and a reinforcement film 136, the reinforcement film 136 being adhered to the entire lower surface of the glass sheet 135 using adhesive. As described above, the resistive membrane 131 is formed on the surface of the base sheet member 130 that faces to the top sheet member 110. By having the top sheet member 110 and the base sheet member 130 face one another with the dot spacers 160 in between, an optimum distance between the resistive membrane 111 and the resistive membrane 131 is maintained.

FIG. 4 shows a table which presents thicknesses and thermal linear expansion coefficients of structural members laminated in the touch panel 100 (materials and thicknesses of the reinforcement film 136 are explained later with reference to FIG. 6).

The polarizing plate 102 used here is made by sandwiching a drawn PVA (polyvinyl alcohol) film, on which a dichromatic pigment, such as iodine or dichromatic dye, has been absorbed and oriented, between TAC (triacetylacetate) films as protective films using adhesive. In this embodiment, the thickness of the PVA film is 20 $\mu$m and the thickness of the two sheets of the TAC film is 110 $\mu$m (55 ||m×2). Since the thin PVA film expands as the thick TAC films expand, the thermal linear expansion coefficient of the polarizing plate 102 as a whole is approximately equal to that of the TAC films ($5.4 \times 10^{-5}$ cm/cm/°C.).

The quarter wavelength plate 103 is made of a PC (polycarbonate) film.

The light-isotropic film 104 is a resin film that does not polarize incident light. In this embodiment, a norbornene thermoplastic transparent resin having an aliphatic ring structure, for example, ARTON (registered trademark) film manufactured by JSR Corporation is used as the light isotropic film 104. ARTON film is suited to use in touch panels due to its excellent transparency, surface hardness, and heat resistance.

The reinforcement film 136 is made of a normal film without polarization property, such as a TAC film and a PC film. The effects produced by the reinforcement film 136 will be explained later in this specification.

As can be seen from the table 1 of FIG. 4, the thermal linear expansion coefficient of each of the polarizing plate 102, the quarter wavelength plate 103, and the light isotropic film 104 is about eight to nine times that of the glass used in the base sheet member 130. Accordingly, as the temperature rises, the members forming the top sheet member 110 expand by greater amounts than the glass. The top sheet member 110 and the base sheet member 130 are securely fixed to each other at their edges via the spacer 140. As such, the thermal expansion of the top sheet member 110 increases with the rise of the temperature and results in the aforementioned outward bulge, thereby impairing the appearance and operability of the touch panel 100.

According to this embodiment, however, a PET film whose thermal linear expansion coefficient is lower than those of the polarizing plate 102 and the light isotropic film 104 is placed on the top of the top sheet member 110 as the bulge-resistant film 101. With such a construction, the top sheet member 110 hardly bulges outward in high temperature environments.

On the contrary, at a low ambient temperature below 0° C., the operability of the touch panel 100 with the above construction was impaired. The thermal linear expansion coefficients of the TAC film and the PC film that respectively constitute the polarizing plate 102 and the quarter wavelength plate 103 in the top sheet member 110 are higher than that of the bulge-resistant film 101 (the PET film). Therefore, in an extreme low temperature, the films laminated below the bulge-resistant film 101 in the top sheet member 110 contract by a greater extent. This causes such a bending force to make the top sheet member 110 slightly upward and reduces the length of the top sheet member 110 as a whole. On the other hand, as the thermal linear expansion coefficient of the glass sheet 135 is extremely low, the glass sheet 135 does not contract as much as the top sheet member 110. The glass sheet 135 is only 700 $\mu$m thick, and has low rigidity, so that the glass sheet 135 slightly bends downward due to the bending force.

Figure 5A:
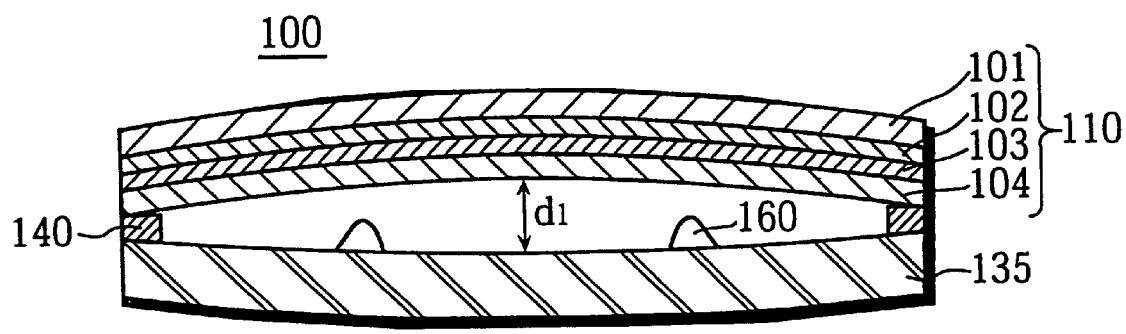
FIGS. 5A and 5B are type views showing a comparison between the bulging states of the glass sheets with or without a reinforcement film laminated in the touch panel.

FIG. 5A is an expanded sectional type view of the touch panel 100 in the above described state. To simplify the drawing, the resistive membranes 111 and 131 are not illustrated.

As in the figure, the distance d1 between the top sheet member 110 and the glass sheet 135 widens, moreover, the force caused by the glass sheet 135 that has bent downward trying to return to its original state acts upon the top sheet member 110, increasing its tension. In such a case, the user needs to apply a greater pressure to operate the touch panel 100, meaning that the operability is greatly degraded.

In view of the above problem, a film whose thermal linear expansion coefficient is higher than that of the glass sheet 135 was adhered to the entire lower surface of the glass sheet 135 as the reinforcement film 136. By so doing, the operability of the touch panel 100 in low temperature environments was greatly improved.

FIG. 6 is a table showing the results of the comparative experiments.

Materials and thicknesses of structural members laminated in the touch panel 100 in these experiments are the same as in FIG. 4 except for the reinforcement film 136. The size of the touch panel used in these experiments is 260 mm×205 mm (12.1 inches).

In respective experiments, the touch panel 100 was left for one hour at the temperature of −20° C., 0° C., 20° C., and 40° C.

The symbols "○" "Δ" and "X" in the table 2 of FIG. 6 denote the evaluation of the operability of the touch panel 100. The operability was evaluated by placing an ordinary stylus (made of polyacetal, 0.8 mm in pen tip radius) on the surface of the touch panel and adding weight to the stylus. The weight needed to operate the touch panel 100 (hereafter referred to as "operating weight") was used for the evaluation. The smaller the operating weight, the better the operability. In these experiments, the symbol "○" shows that the operating weight was less than 100 g, the symbol "Δ" shows that the operating weight was at least 100 g but less than 200 g, and the symbol "X" shows that the operating weight was 200 g or heavier. The symbol "X" represents extremely poor operability, meaning that a touch panel 100 rated as "X" has little value as a product.

As the table 2 of FIG. 6 shows, the operability of the touch panel 100 without the reinforcement film 136 was rated as "X" when the temperature was −20° C., and as "Δ" when the temperature was 0° C., showing poor operability. On the contrary, when the TAC film or the PC film with a thickness of 80 μm was adhered to the lower surface of the glass sheet 135 as the reinforcement film 136, the operability of the touch panel was improved and rated as "Δ" when the temperature was −20° C., and as "○" when the temperature was 0° C. Furthermore, when two sheets of the TAC film or of the PC film, with a thickness of the two sheets being 160 μm in total, were used as the reinforcement film, the operability of the touch panel was substantially improved and rated as "○" when the temperature was −20° C.

The reasons are as follows.

By adhering a film with a higher thermal linear expansion coefficient than the glass sheet 135 to the lower surface of the glass sheet 135, the glass sheet 135 is forced not to bend downward but to bend upward due to the contraction of the top sheet member 110 caused by the fall in temperature. As a result, the distance between the resistive membrane 111 and the resistive membrane 131 does not significantly widen.

Figure 5B:
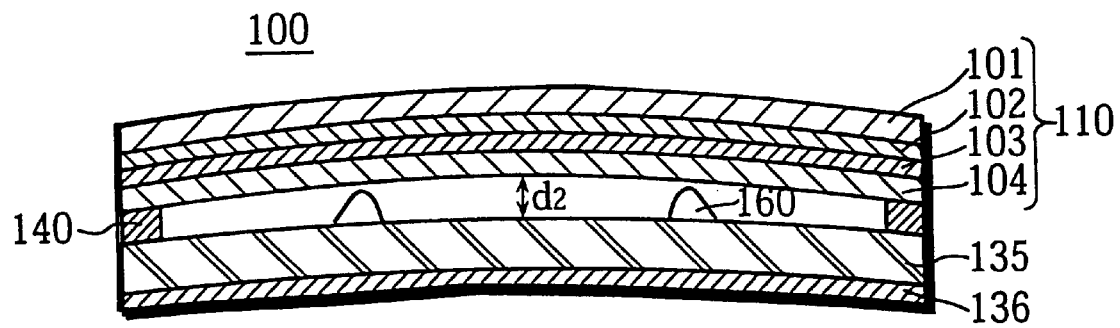

FIG. 5B is an expanded sectional type view of the touch panel in the above described state. The resistive membranes 111 and 131 are not illustrated as in FIG. 5A. In the figure, the upper sheet member 110 contracts, causing the glass sheet 135 to bend downward. However, the reinforcement film 136 adhered to the lower surface of the glass sheet 135 contracts by greater amount than the glass sheet 135 to prevent the glass sheet 136 from bending downward, so that the glass sheet 135 instead bends upward. As a result of this, the upper sheet member 110 and the glass sheet 135 are bent in the same direction, so that the distance d2 between the upper sheet member 110 and the glass sheet 135 is kept almost unchanged even at a low ambient temperature. Accordingly, favorable operability of the touch panel can be maintained.

As described above, to have the glass sheet 135 bend upward almost parallel to the upper sheet member 110, it is preferable that the thermal linear expansion coefficient of the reinforcement film 136 is almost the same as the highest thermal linear expansion coefficient of the materials laminated in the top sheet member 110. The thermal linear expansion coefficients of the TAC film and the PC film that usually constitute the polarizing plate and the quarter wavelength plate are extremely high (as shown in FIG. 4). Other films that have almost the same thermal linear expansion coefficients as the TAC film or the PC film are polyarylate, polysulfone, polyether sulfone (PES), polyvinyl alcohol, norbornene resin (including above described ARTON film) and olefin resin. One sheet, or more sheets depending on the case, of any of the above listed resin films with a predetermined thickness can be laminated in a touch panel as the reinforcement film 136. When a plurality of sheets are laminated as the reinforcement film 136, each sheet can be a different material. If the thermal linear expansion coefficient of each of the plurality of films is different, the films should be laminated in descending order of thermal linear expansion coefficients from outside, so that a bending force to make the glass sheet 135 bend upward is generated more effectively.

In principle, if the thermal linear expansion coefficient of the reinforcement film is at least slightly higher than the glass sheet 135, some degree of bending force to make the glass sheet 135 bend upward is generated. Therefore, the operability of the touch panel with such a reinforcement film is improved to some extent compared with the touch panel without a reinforcement film. In that sense, films that can be used as the reinforcement film 136 are not limited to those listed above.

If the reinforcement film 136 with a high thermal linear expansion coefficient is extremely thin, a bending force of the glass sheet 135 to bend downward exceeds a suppressing force of the reinforcement film 136, therefore the reinforcement film 136 should have a certain thickness. This explains the following results. In the table 2 of FIG. 6, when a TAC film or a PC film with a thickness of 80 μm was used as the reinforcement film 136, the operability was rated as "Δ" when the temperature was −20° C. However, by making the thickness of each film 160 μm, the operability was improved and rated as "○". It should be noted here that the reinforcement film 136 has a limit in thickness due to the following reason. If the touch panel 100 with an excessively thick reinforcement film 136 is left in a high temperature environment of 60° C. to 70° C., such as inside a car parked outside in midsummer, increased thermal stress due to expansion of the reinforcement film 136 warps the touch panel 100. In the worst case, the thermal stress may even crack the glass sheet 135.

An appropriate thickness of the reinforcement film 136 is determined by deliberating the thermal linear expansion coefficient of the films used for the polarizing plate 102 or the quarter wavelength plate 103, the thickness of the glass sheet 135, the thermal linear expansion coefficient of the reinforcement film 136, and the size of the touch panel 100, and by considering the balance between the forces imposed on the glass sheet 135 due to the thermal stress of the top sheet member 110 and the reinforcement film 136 at various ambient temperatures. More specifically, a film whose thickness is in the range of 50 μm and 200 μm inclusive is used as the reinforcement film 136.

Making the glass sheet 135 too thin weakens the glass sheet 135 and raises the manufacturing cost. The thickness should therefore be at least around 0.4 mm. On the other hand, making the glass sheet 135 too thick rises the weight of the apparatus including the touch panel. It is preferable that the thickness of the glass sheet 135 is below 1.85 mm that is the thickness of the glass sheets used in conventional touch panels.

By fixing the reinforcement film 136 securely to the glass sheet 135 at its edges, the reinforcement film 136 can make the glass sheet to bend upward. However, if there is a space between the glass sheet 135 and the reinforcement film 136, extraneous light incident coming through the space is reflected on the surface of the reinforcement film 136, which is unfavorable in view of reducing glare. Moreover, to prevent the thin glass sheet 135 from being easily damaged, it is better for the entire surface of the reinforcement film 136 to be adhered to the glass sheet 135 using adhesive.

In FIG. 3, a transparent LCD panel 200 is provided directly underneath the touch panel 100. This LCD panel 200 has a well known construction made up of a pair of polarizing plates 202 and 203 and a liquid crystal cell 201 placed therebetween. A quarter wavelength plate 204 is laminated on the upper surface of the polarizing plate 202.

Also, a backlight source (not shown) is located underneath the LCD panel 200.

The following is a brief explanation as to how visibility of the display is improved by the polarizing plate 102 and the quarter wavelength plates 103 and 204.

The polarizing plate 102 is set so that its polarizing axis is parallel to the polarizing axis of the polarizing plate 202 in the LCD panel 200. Meanwhile, the quarter wavelength plate 103 is set so that its optical axis forms an angle of 45° with the polarizing axis of the polarizing plate 102.

Extraneous light incident on the bulge-resistant film 101 is converted into linearly polarized light by the polarizing plate 102, and further converted into circularly polarized light by the quarter wavelength plate 103. This circularly polarized light is reflected partly off the upper surfaces of the base sheet member (glass) 130, the LCD panel 200, and/or resistive membranes 111 and 131 and as a result reenters the quarter wavelength plate 103 where it is changed to linearly polarized light. Here, since reflection reverses the rotation direction of the circularly polarized light, the polarizing plane of the linearly polarized light emerging from the quarter wavelength plate 103 has been rotated 90° with respect to the polarizing plane of the linearly polarized light previously emitted from the polarizing plate 102. Therefore, the linearly polarized light that has emerged from the quarter wavelength plate 103 cannot pass through the polarizing plate 102 and is not emitted by the touch panel 100.

Thus, when extraneous light incident enters the touch panel 100 and is reflected back off the inside of the touch panel 100, the reflected light will not leave the touch panel 100. Accordingly, the user can get a clear view of the content displayed on the LCD panel 200 outdoors, without suffering from glare.

The quarter wavelength plate 204 attached to the upper surface of the LCD panel 200 is set so that its optical axis forms an angle of 45° with the polarizing axis of the polarizing plate 202. Since the polarizing axis of the polarizing plate 202 is set parallel to the polarizing axis of the polarizing plate 102 of the touch panel 100, the optical axis of the quarter wavelength plate 204 also forms an angle of 45° with the polarizing axis of the polarizing plate 102. The optical axis of the quarter wavelength plate 204 is oriented so as to form an angle of 45° with the polarizing axis of the polarizing plate 102 in an opposite direction to a direction in which the optical axis of the quarter wavelength plate 103 forms an angle of 45° with the polarizing axis of the polarizing plate 102. That is to say, the optical axes of the quarter wavelength plates 103 and 204 are set perpendicular to each other.

With this arrangement, light from the backlight source which becomes linearly polarized light having passed through the polarizing plate 202 of the LCD panel 200 is converted into circularly polarized light by the quarter wavelength plate 204. This circularly polarized light is changed again into linearly polarized light when passing through the quarter wavelength plate 103. Here, since the optical axes of the quarter wavelength plates 103 and 204 are perpendicular to each other as explained above, the polarizing plane of this linearly polarized light emerging from the quarter wavelength plate 103 recovers the original orientation, that is, the polarizing plane of the linearly polarized light is parallel to the polarizing plane of the linearly polarized light immediately after passing through the polarizing plate 202. Also, since the polarizing axes of the polarizing plates 102 and 202 are parallel to each other, the polarizing plane of the linearly polarized light that has traveled through the quarter wavelength plate 103 from the backlight source is parallel to the polarizing axis of the polarizing plate 102, so that this linearly polarized light can pass through the polarizing plate 102 as it is. Accordingly, light from the backlight source is emitted to the outside without being blocked by the polarizing plate 102 and the quarter wavelength plate 103 which are disposed to guard against glare. Thus, a sufficient amount of light can be obtained with no need to increase the output of the backlight source, which ensures high visibility.

It should be noted here, if a quarter wavelength plate made of an appropriate resin film is used as the reinforcement film 136, the quarter wavelength plate 204 does not need to be provided on the LCD panel 200, which will make the construction of the LCD panel 200 simpler and less costly.

The quarter wavelength plate with higher thermal linear expansion coefficient than the glass sheet 135 can be made of PC (polycarbonate) as in the above embodiment, or can also be made of polyarylate, polysulfone, PVA, norbornene resin, or olefin resin.

Modifications

Although the present invention has been described based on the above embodiment, the invention should not be limited to such. For instance, the following modifications are possible.

(1) In the above embodiment, linearly polarized light has been converted into circularly polarized light, to ensure visibility and resistance to glare (such a structure is hereafter referred to as "circularly polarizing structure"). However, a certain level of visibility and glare resistance can be achieved even if the touch panel 100 does not have the circularly polarizing structure, as long as it is equipped with the polarizing plate.

Figure 7:
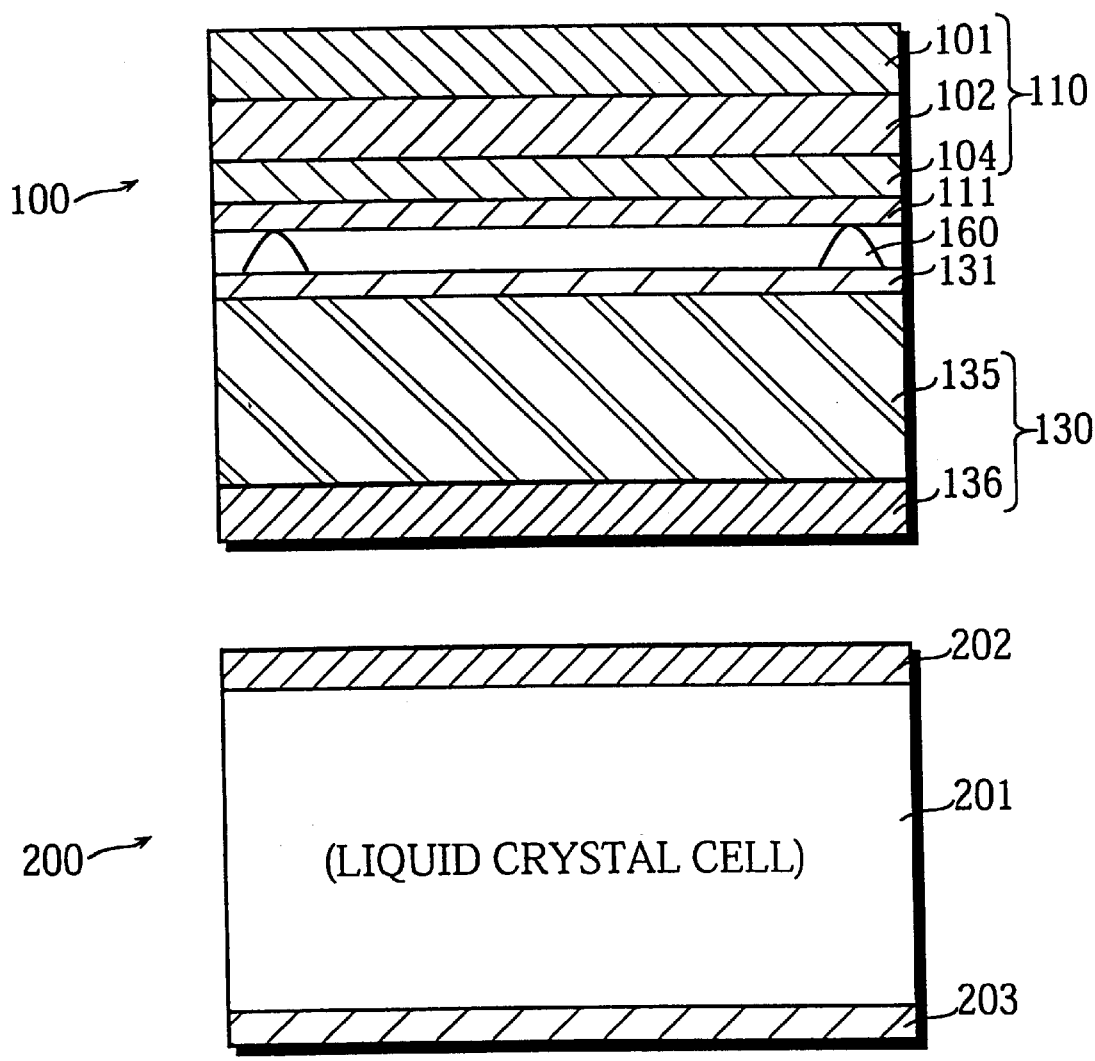
FIG. 7 shows a partly enlarged sectional view showing the laminated structure of a modification of the touch panel.

FIG. 7 is a partly enlarged sectional view showing the laminated structure of the touch panel 100. As with FIG. 3, the laminated structure of the LCD panel 200 is also illustrated.

The top sheet member 110 is made by laminating the bulge-resistant film 101, the polarizing plate 102, and the light isotropic film 104 using adhesive (not shown). The resistive membrane 111 is formed below the lowest light isotropic film 104. The base sheet member 130 is opposed to the top sheet member 110 with the dot spacers 160 being placed therebetween, and the resistive membrane 131 is formed on the opposed surface of the base sheet member 130. The reinforcement film 136 is adhered to the lower surface of the glass sheet 135.

This structure differs with the circularly polarizing structure in FIG. 3 in that the quarter wavelength plate 103 has been omitted.

Also, the quarter wavelength plate 204 has been omitted from the LCD panel 200 underneath the touch panel 100 in FIG. 3.

In this structure, the polarizing plate 102 in the touch panel 100 is set so as to have its polarizing axis parallel to the polarizing axis of the polarizing plate 202 in the LCD panel 200. This being so, light from the backlight source, having passed through the polarizing plate 202, can pass through the polarizing plate 102 in the touch panel 100 as it is. Thus, the amount of light from the backlight source hardly decreases, thereby favorable visibility can be ensured.

Meanwhile, the amount of extraneous light incident on the bulge-resistant film 101 decreases by approximately ½ at the polarizing plate 102, as the polarizing plate 102 allows only light whose polarizing plane is parallel to its polarizing axis to pass through. As a result, glare can be reduced to a tolerable level, though to a lesser extent than the touch panel 100 of the circularly polarizing structure.

(2) To further improve glare resistance and visibility, a well known anti-glare treatment (AG finish) may be applied to the surface of the bulge-resistant film 101, or the surface of the bulge-resistant film 101 may be covered with multiple thin layers that have different refractive indices, to attain antireflection (AR finish).

(3) In the above embodiment, the glass sheet 135 is used as a basis of the base sheet member 130, however, a resin plate that has high rigidity may alternatively be used. In this case, too, a resin film with a higher thermal linear expansion coefficient than the resin plate is to be adhered to the lower surface of the resin plate.

(4) Even with the normal construction of the touch panel whose top sheet member does not include the polarizing plate and the quarter wavelength plate, when a resin film with a higher thermal linear expansion coefficient than the base sheet member is used as the top sheet member, the base sheet member bends downward in low temperature environments. The above problem can be solved by adhering a reinforcement film with a higher thermal linear expansion coefficient than the base sheet member (more preferably a reinforcement film with almost the same thermal linear expansion coefficient as the resin film) to the lower surface of the base sheet member, thereby favorable operability of the touch panel can be maintained in low temperature environments.

(5) In the above embodiment, the reinforcement film is adhered to the entire lower surface of the glass sheet using adhesive. As the reinforcement film is used aiming to provide the lower surface of the glass sheet with a greater tension than the upper surface of the glass sheet at a low ambient temperature, the reinforcement film can be partly adhered to the lower surface of the glass sheet, so long as the aim is achieved. Moreover, the reinforcement film can be provided in any shape, such as strips or a lattice. In that case, needless to say, it is preferable to use a more transparent reinforcement film so that the adhered parts are not visible for the user.

(6) In the above embodiment, resistive membranes are respectively formed on the entire opposed surfaces of the top sheet member and the base sheet member in the touch panel. However, two sets of strips of resistive membranes may be respectively formed on the top sheet member and the base sheet member so that each set of the resistive membranes is perpendicular to the other set. The present invention can be applied to every touch panel that includes a top sheet member and a base sheet member and the distance between these two sheet members has an influence on the operability of the touch panel.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A resistive-membrane touch panel comprising:
   a first sheet member having a first resistive membrane on a main surface thereof;
   a second sheet member that is flexible and has a second resistive membrane on a main surface thereof, the second sheet member being opposed to the first sheet member with a spacer in between so that the second resistive membrane and the first resistive membrane face each other with a certain spacing therebetween; and
   a third sheet member that is provided on at least a part of another main surface of the first sheet member that does not face the second sheet member,
   wherein the third sheet member has a higher thermal linear expansion coefficient than the first sheet member.

2. The resistive-membrane touch panel of claim 1, wherein the second sheet member includes a polarizing plate whose thermal linear expansion coefficient is higher than a thermal linear expansion coefficient of the first sheet member, and the thermal linear expansion coefficient of the third sheet member is almost the same as the thermal linear expansion coefficient of the polarizing plate.

3. The resistive-membrane touch panel of claim 1, wherein the first sheet member is a glass sheet whose thickness is at least 0.4 mm but is below 1.85 mm.

4. The resistive-membrane touch panel of claim 1, wherein the third sheet member is made of at least one resin film selected from the group consisting of triacetylacetate film, polycarbonate film, polyarylate film, polysulfone film, polyether sulfone film, polyvinyl alcohol film, norbornene resin film, and olefin resin film.

5. The resistive-membrane touch panel of claim 4, wherein a thickness of the third sheet member is in the range of 50 µm to 200 µm inclusive.

6. The resistive-membrane touch panel of claim 1, wherein the second sheet member comprises a plurality of sheet members including a polarizing plate and a first quarter wavelength plate, the first quarter wavelength plate being placed nearer to the spacing than the polarizing plate, and
   a second quarter wavelength plate is placed on an opposite side of the first sheet member to the second sheet member.

7. The resistive-membrane touch panel of claim 6, wherein the third sheet member serves as the second quarter wavelength plate.

8. The resistive-membrane touch panel of claim 7, wherein the third sheet member is made of at least one resin film selected from the group consisting of polycarbonate film, polyarylate film, polysulfone film, polyvinyl alcohol film, norbornene resin film, and olefin resin film.

9. The resistive-membrane touch panel of claim 6, wherein an optical axis of the first quarter wavelength plate forms an angle of 45° with a polarizing axis of the polarizing plate in a first direction, and an optical axis of the second quarter wavelength plate forms an angle of 45° with the polarizing axis of the polarizing plate in a second direction that is opposite to the first direction.

10. The resistive-membrane touch panel of claim 1 further comprising:
    a fourth sheet member that is provided on an outer main surface of the second sheet member,
    wherein the second sheet member has a polarization property and the fourth sheet member has a lower thermal linear expansion coefficient than the second sheet member.

11. The resistive-membrane touch panel of claim 10, wherein the fourth sheet member is made of a polyethylene terephthalate film.

12. A resistive-membrane touch panel comprising:
    a first transparent member having a first thermal linear expansion coefficient and a respective length and width greater than its thickness with a first resistive portion on a first surface;
    a second transparent member extending across the first transparent member and spaced a predetermined operative distance from the first transparent member, a second resistive portion on a first surface of the second transparent member opposite the first surface of the first transparent member, the second transparent member being flexible to permit a user to exert a force on the second transparent member to cause the second resistive portion to close the operative distance and contact the first resistive portion; and a third member operatively connected to the first transparent member and having a sufficient thickness and a second coefficient of thermal linear expansion different from the first thermal linear expansion coefficient across an approximate temperature range of −20° to 40° Celsius to substantially offset any thermal forces which would bend the first transparent member to substantially vary the operative distance between the first and second transparent member.

13. The resistive-membrane touch panel of claim 12, wherein the third member is operatively connected to a second surface of the first transparent member.

14. The resistive-membrane touch panel of claim 12, wherein the second transparent member has a fourth member operatively connected to the second transparent member with a third coefficient of thermal linear expansion coefficient higher than the thermal linear expansion coefficient of the second transparent member across the approximate temperature range of −20° to 40° Celsius to substantially offset any thermal forces which would bend the second transparent member to substantially vary the operative distance between the first and second transparent members.

\* \* \* \* \*